(12) United States Patent
Chont

(10) Patent No.: US 6,698,339 B2
(45) Date of Patent: Mar. 2, 2004

(54) BALING CHAMBER HAVING ADJUSTABLE CROSS SECTION

(75) Inventor: Pascal Chont, Dijon (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/201,005

(22) Filed: Jul. 23, 2002

(65) Prior Publication Data

US 2003/0029148 A1 Feb. 13, 2003

(30) Foreign Application Priority Data

Aug. 10, 2001 (DE) .......................... 101 39 450

(51) Int. Cl.[7] .................................................. B30B 9/30
(52) U.S. Cl. ............................................ 100/8; 56/432
(58) Field of Search ........................... 100/8, 13, 177, 100/178, 190, 188 R, 189, 218, 219, 226, 242, 246, 41; 56/341, 343, 432, 433, 440, 442, 443, 446, 434

(56) References Cited

U.S. PATENT DOCUMENTS

| | | | | |
|---|---|---|---|---|
| 4,037,528 A | * | 7/1977 | White et al. ................. | 100/191 |
| 4,489,648 A | * | 12/1984 | Naaktgeboren ............... | 100/191 |
| 4,750,418 A | * | 6/1988 | Naaktgeboren ............... | 100/50 |
| 5,735,199 A | | 4/1998 | Esau et al. | |
| 5,950,410 A | | 9/1999 | O'Brien et al. ................ | 56/341 |
| 6,026,741 A | * | 2/2000 | Lippens et al. ............... | 100/41 |
| 6,134,870 A | * | 10/2000 | Lippens et al. ............... | 56/432 |

FOREIGN PATENT DOCUMENTS

| | | |
|---|---|---|
| DE | 38 20 367 | 5/1991 |
| EP | 0 290 774 | 3/1988 |
| EP | 0 940 072 | 2/1999 |

* cited by examiner

Primary Examiner—Allen Ostrager
Assistant Examiner—Shelley Self

(57) ABSTRACT

A baler is provided with a baling chamber for producing parallelepiped bales. The baling chamber has an upper part that can be repositioned in height by servo motors. The baling plunger is constructed of upper and lower parts that can also be adjusted vertically a corresponding amount.

12 Claims, 3 Drawing Sheets

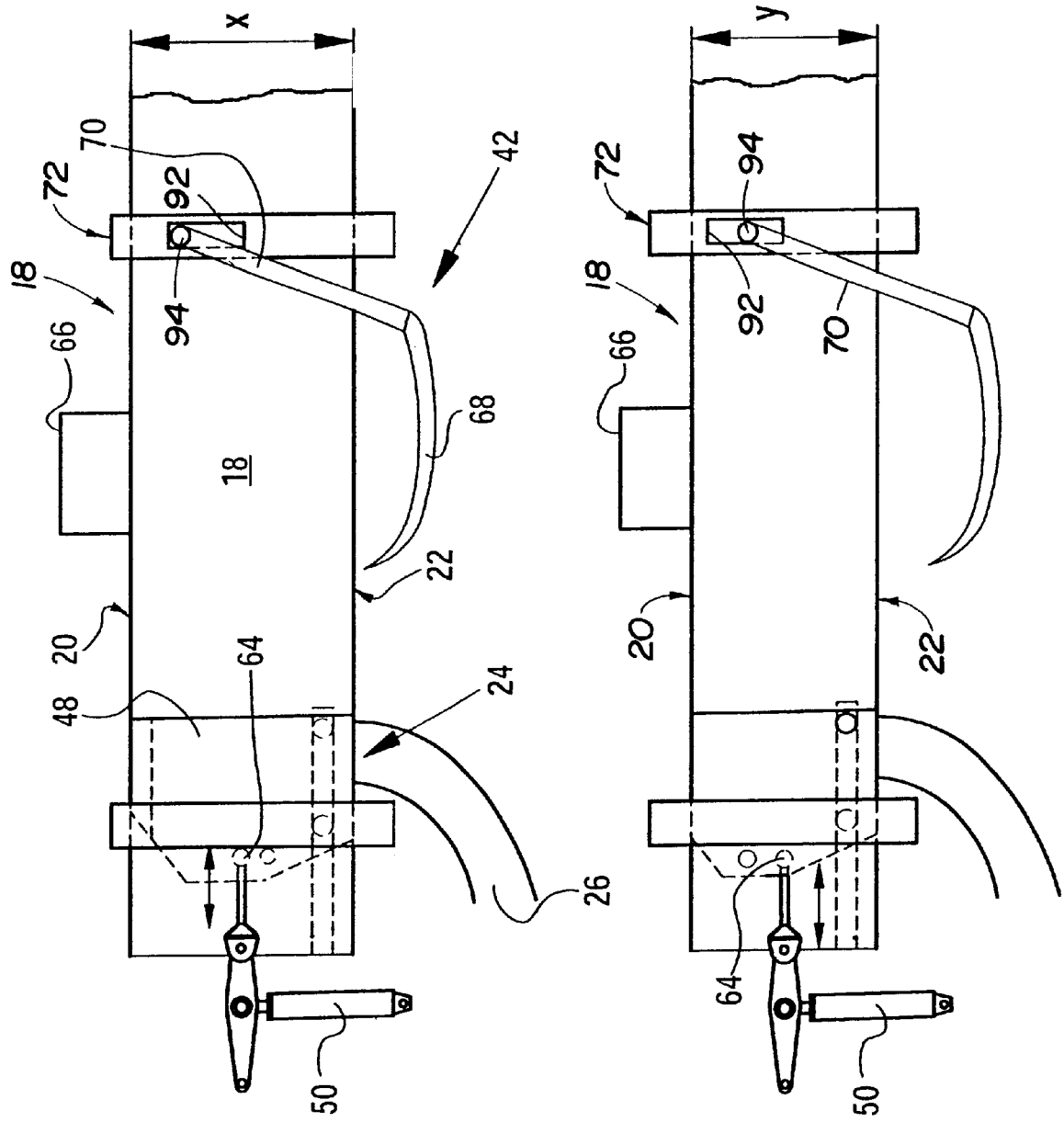

BALING CHAMBER HAVING ADJUSTABLE CROSS SECTION

FIELD OF THE INVENTION

The invention concerns a baler with a baling chamber shaped for forming parallelepiped bales and a baling plunger that can move within it.

BACKGROUND OF THE INVENTION

The prospectus "GREENLAND Large Baler Vario Industry" no publication date, discloses a large baler with a baling chamber that can be repositioned in 5 cm. steps between a height of 0.65 m. and 0.8 m. In this way bales of differing dimensions can be produced.

The problem underlying the invention is seen in the fact that a rebuilding to another chamber cross section requires approximately one working day. Furthermore, at the present, a greater range of chamber cross sections is being demanded.

SUMMARY OF THE INVENTION

According to the present invention, there is provided an improved baling chamber construction for forming parallelepiped bales which permits the cross sectional area of the chamber to be adjusted.

An object of the invention is to provide a baling chamber of the type described above wherein the cross section of the baling chamber can be changed as desired and made to conform to the size, particularly the height, of the transport vehicle available for the particular field, this change being accomplished without a time consuming rebuilding procedure.

A specific object of the invention is to provide an adjustable baling chamber wherein the needles together with the entire binding arrangement is located on the movable upper part of the housing such that the spacial relationship does not change during its repositioning, thereby assuring a safe entry of the points of the needles into the knot tying device.

Another object of the invention is to construct the drive for the plunger such that it may be repositioned in the direction of repositioning of the upper housing part of the baling chamber such that it makes it possible to apply the force at all times to the center of the baling plunger, so that in its end position this component occupies a safe end position without any tilting.

Another specific object of the invention is to provide a baling chamber having an upper housing part which may be repositioned by the use of spindles, spread linkages or the like, but more advantageously may be repositioned by the use of motors, particularly of remote controlled motors, since these can transmit great forces by simple means.

Yet another specific object of the invention is to provide an adjustable baling chamber wherein the side surfaces are covered across their entire height, then no part of the crop to be baled can escape and cause jams. This is accomplished by making the side surfaces of continuous, one-piece components extending from the top or from the bottom, the result being a smooth surface with low frictional resistance; and by making the side walls in upper and lower sections that overlap in the vertical direction, the entire side wall projects are neither at the top nor at the bottom. Depending on the dimensions selected, such a large vertical repositioning movement can be attained, that access to the baling chamber from the outside is possible.

Another object of the invention is to provide an adjustable baling chamber which is of a light-weight configuration achieved by having the large components, particularly the cover and the bottom as well as the side walls of the baling chamber in a light-weight configuration so that the forces are absorbed by a few massive components, particularly the repositioning arrangement, which surround, carry and reposition these.

The adjustment of the baling plunger to accommodate adjustments in the size of the baling chamber may be done by constructing the plunger for being constructed in a telescoping fashion so that it may be extended and retracted in the direction of its height, this being accomplished in a technically simple and robust solution by constructing the baling plunger such that it contains a lower part upon which one or more upper parts can be applied selectively. The upper part that was applied can be configured as a box or the like.

In order to avoid the upper part of the plunger from shifting relative to the lower part during the baling process, positive locking elements are provided, for example, grooves and ribs, shoulders, an enclosing rim, journals and recesses and the like, which lock the upper part to the lower part. Compared to a friction lock or an interference lock, this has the advantage of greater reliability or greater flexibility.

The upper part can be exchanged easily and nevertheless occupies a secure position, if securing devices are provided for these, that are configured in conventional manner, for example, as screws, pins, locks and the like.

The covering at the sides of the baling chamber has no effect upon the repositioning in height, if the side walls extend into slots in the movable or the fixed parts of the housing and can extend into these to a greater or lesser distance.

The ability of the needles to conform to the knot tying devices can be accomplished easily if openings are provided in the base body through which the journals can extend which carry the needle support arms and which are connected to the movable part of the repositioning arrangement.

If instead of a repositioning in the height of the bale, its width is to be changed, then not only the height of the platform of the transport vehicle, but alternatively its width and length can be taken into account and an optimum loading can be attained. In principle, the repositioning arrangement would only be rotated through 90° and extended in the horizontal direction. The ribs would extend not in the height but in the width. If the supply channel is made to conform in its cross section or is provided with guide vanes, a uniform charge over the entire width is assured.

BRIEF DESCRIPTION OF THE DRAWINGS

The drawing shows an embodiment of the invention that shall be described in greater detail in the following.

FIG. 2 shows a schematic side view of the baling chamber of the baler in a maximum height condition.

FIG. 3 shows a schematic side view of the baling chamber of the baler in a minimum height condition.

DESCRIPTION OF THE PREFERRED EMBODIMENT

Figure 1:
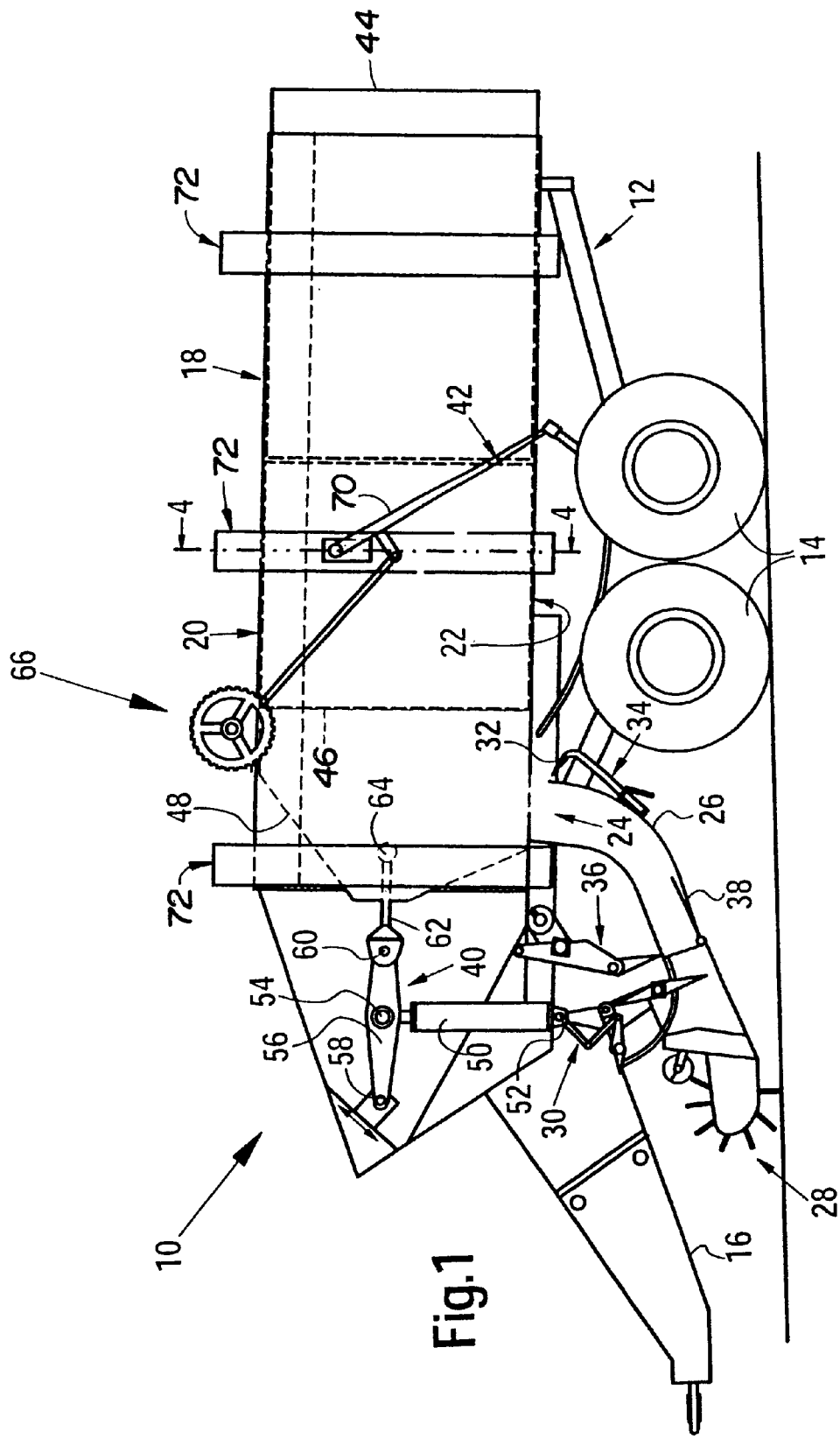
FIG. 1 shows a schematic side view of a baler according to the invention.

FIG. 1 shows a baler 10, in the form of a large baler for the production of parallelepiped bales, including a frame 12 that is supported on the ground on support wheels 14 in a tandem arrangement. A towbar 16 is connected to and projects forwardly from a front location of the frame 12, and is configured in such a way that it can be connected to a towing vehicle, such as an agricultural tractor, not shown, and which is equipped with a power take-off shaft that delivers power for the drives of various driven components of the baler 10. A baling chamber 18 or an enclosure of rectangular cross section is formed partially by an upper housing part 20 and a lower housing part 22, where the lower housing part 22 is provided with a crop inlet 24, to which a curved supply channel 26 is connected, that is used as a pre-compression chamber, as will be described below. A take-up arrangement 28 in the form of a pick-up with a screw conveyor conveying towards the center is arranged ahead of the supply channel 26, in order to take up a swath of harvested crop from the ground and to deliver it to a compression fork 30, that is used to compress harvested crop in the supply channel 26 until a load of pre-determined density has accumulated downstream of fingers 32 of a retaining arrangement 34, where the retaining arrangement 34 is arranged to pivot between a retaining position, in which the fingers 32 project into the supply channel 26 in the vicinity of the crop inlet 24, and a supply position, in which the fingers 32 are retracted out of the supply channel 26, in order to make it possible for a load of harvested crop to be inserted by means of a loading fork assembly 36 through the crop inlet 24 into the baling chamber 18. At a forward lower location of the supply channel 26, a spring loaded flap 38 is mounted, free to pivot, that pivots as a function of the crop loaded into the supply channel 26 as it reaches a desired density in order to supply current to an electrical control circuit (not shown) which establishes corresponding drive connections, that initially have the effect that the retaining arrangement 34 moves in such a way that the fingers 32 are retracted out of the blocking position into the position shown in FIG. 1, and then activates the loading fork assembly 36 in such a way that thereupon the compression fork 30 can slide through the supply channel 26 and can move the load of the harvested crop into the baling chamber 18. Once the load of the harvested crop has been forced into the baling chamber 18, a plunger drive mechanism 40, that is arranged ahead of the baling chamber 18, is actuated in a controlled sequence, after the loading fork assembly 36, in order to move a plunger 48 rearwardly so as to move the harvested crop to the rear into the baling chamber 18, where it is compressed in a slab, as is well known in the state of the art. After a stack of compressed slabs has reached a pre-determined length, a needle assembly 42 including several curved needles 68 is actuated in order to deliver or conduct several strands of binding twine to a corresponding number of knot tying devices, not shown, that operate in such a way that they lay lengths of twine around the pre-determined length of the stack, in order to form a bale 44 that is ready for unloading, which occurs when it is forced out of the rear end region of the baling chamber 18 by a part of a bale 46 which increases in length, when new loads of harvested crop are forced into the baling chamber 18. Since the invention, as explained below, concerns an adjustment of the cross section of the baling chamber 18, the amount of the harvested crop supplied could be made to conform to the particular size of the baling chamber 18.

If reference is again made to the details of the plunger drive mechanism 40, then it can be seen that the latter is coupled to the baling plunger 48 for causing the plunger to move back-and-forth in the baling chamber 18 between a retracted position ahead of the crop inlet 24 and an extended position beyond the crop inlet 24 (see FIG. 1). This movement of the baling plunger 48 has the result that loads of crop that are introduced from the supply channel 26 into the baling chamber 18 are compressed against a stack of crop which includes the partially completed bale 46 and/or the completed bale 44. Furthermore, the plunger drive mechanism 40 includes a driver 50 configured as an actuating arrangement, that can be extended and retracted, which is pictured here as a double-acting hydraulic cylinder-piston unit, whose cylinder end is anchored with a pin 52, free to pivot, on the frame 12 at a location above the compression fork 30. The rod end of the driver 50 is connected at a connecting point 54, with a device such as a pin, at a location between opposite ends of a guide arm 56 used as crank arm, whose forward end region is connected, free to pivot, at a bearing location 58 on the frame 12. A rear end region of the guide arm 56 is connected at a bearing location 60 with a device such as a pin to a forward end region of a second guide arm 62 operating as connecting rod, whose rear end region is connected at a bearing location 64, by means of a device such as a pin, to the baling plunger 48. It should be noted here that the connecting pins of the bearing locations 58 and 64 are arranged along a line of centers that lies along or approximately along a central longitudinal centerline of the baling chamber 18. This has the result that the reaction force of the crop, which acts upon the baling plunger 48, is essentially absorbed by the driver 50 when the first and the second guide arms 56 and 62 are located along a line, which is the case, when the baling plunger 48 is located in its rear end position. Furthermore it should be noted that the two guide arms 56 and 62 could be configured as a pair of guide arms spaced at a distance to each other in the transverse direction. The driver 50 would then be connected at the connecting point 54 (pin) at a point between the pair of arms which form the first guide arm 56. It should therefore be recognized that the baling plunger 48 forms the slider of a slider crank mechanism that includes the first guide arm 56 as the crank arm and the second guide arm 62 as the connecting rod. Although the linkage formed by the guide arms 56 and 62 does not move beyond a dead center position, it could be characterized as a toggle joint mechanism or a toggle joint. Although the preferred embodiment shows a driver 50, that is connected to the first guide arm 56 at a location between opposite ends of the first guide arm 56, the driver furthermore could be connected at a location between the bearing location 58 and the bearing location 64, for example, the driver 50 could be connected at the pin 60 or at a point along the length of the second guide arm 62, where the operation can be performed even better than with the known arrangement, in which the actuating arrangement is connected directly to the baling plunger 48.

Further details of this baler 10 are described in EP-A2-0 940 072 whose disclosure is incorporated herein. It should be noted that in place of this special drive with a hydraulic motor, a conventional driver including a gear driven crank could be applied equally well.

FIGS. 2 through 5 concern only the configuration of the baling chamber 18 and the baling plunger 48 carried in it. The unique property of this invention lies in the fact that the cross section, particularly the height of the baling chamber 18 can be changed, in order to be able to produce bales 44 of differing heights and thereby also differing mass.

For this purpose, the upper part of the housing 20 is arranged so that it can be repositioned in height, as will be described below on the basis of FIGS. 4 and 5.

The upper part of the housing 20 is equipped with a cover or top 21, that is configured in conventional manner as a heavy profiled sheet metal component, that is relatively stiff in bending in itself and preferably extends as a one-piece component over the entire length of the baling chamber 18. On the upper side of the upper housing part 20 and to the rear of the supply channel 26, a knot tying device assembly 66 is provided in a known manner into which the needles 68 of the needle assembly 42 can penetrate. Each side of the needle assembly 42 includes a needle support arm 70, that can pivot in a vertical plane and move the needles 68 through the baling chamber 18 with the twine, not shown, to the knot tying device assembly 66 as soon as a bale 44 is being bound. The cover 21 is carried at various points along its length by a yoke 72 which forms a part of an adjusting or repositioning arrangement 74 which also includes a base body 76.

The lower housing part 22 includes a bottom 23 also of conventional configuration of a steel sheet metal, profiled if necessary, that extends over the entire length of the baling chamber 18 and lies upon each of the base bodies 76 without moving. While the cover 21 is essentially closed, the bottom 23 is interrupted by the crop inlet 24 for the supply channel 26 and the opening for the entry of the needles 68. The cover 21 and the bottom 23 extend generally parallel to each other; nevertheless in the rear outlet region for the bale 44, adjustable flaps, not shown but well known in themselves, are provided that give the bale 44 a certain resistance to movement.

The plunger drive mechanism 40 is coupled to the baling plunger 48 such that the plunger 48 can be slid by means of the driver 50 between two end positions as this is described in EP-A2-0 940 072.

In the preferred embodiment, the baling plunger 48 can consist of one or more upper parts 78 and a lower part 80 and thereby can occupy various heights, as is described below.

The upper part 78 is configured as a steel assembly and fits exactly upon the upper side of the lower part 80; several upper parts are configured in analogous manner. The upper part 78 is provided with a first positive locking element 82 that projects downward and that fits into a complementary second positive locking element 84 in the lower part 80. The upper part 78 is secured on the lower part 80 with several securing devices 112.

Both positive locking elements 82, 84 extend transverse to the direction of movement of the baling plunger 48 and are provided with a rectangular cross section. In the assembled condition of the upper and the lower part 78 and 80 they engage one another and form a positive lock that retains the upper part 78 in a secure position against the force developed by the crop being baled. For each upper or lower part 78 or 80 several identical positive locking elements 82, 84 may be provided. If several upper parts 78 are provided, these are preferably equipped on the lower side with at least one first positive locking element 82 and on the upper side with at least one second positive locking element 84. In the illustration of FIGS. 4 and 5, positive locking elements 82, 84 configured as ribs and grooves are provided; as an alternative journals and recesses, sets of gear teeth and the like may be provided. It would also be possible to configure the first positive locking element 82 as a hollow component and the second positive locking element 84 as a projecting component.

The securing devices 112 are indicated only by centerlines and contain screws in the upper part 78 and threaded holes in the lower part 80. Snap connections or bayonet connections, pins or the like would also be possible.

The lower part 80 is configured as a completely closed box. Deviating from this, the lower part 80 may also be open downward and/or on the left side as seen in FIG. 1. On the side walls of the lower part 80, journals 88 are provided with rolls 90 supported in bearing on these, free to rotate, particularly several in a row at equal height.

On the side facing the crop to be baled, compression means, channels for the passage of the needles or the like, not shown, may be provided.

The guide arm 62 always engages in a joint with the lower part 80, preferably in such a way that the bearing location 64 is located at half the height of the baling chamber 18. For this purpose several bearing locations 64 located at varying heights in the lower part 80 are provided, which means in the particular case that a pin can be inserted through various holes.

The bearing location 58 for the connection in a joint of the first steering arm 56 is configured so that it can be repositioned in the height as well as in the longitudinal direction of the baling chamber 18, for example, on an inclined plane in such a way that the two guide arms 56, 62 in their extended position in each case extend in the longitudinal center plane of the baling chamber 18. Nevertheless this is only one preferred embodiment that can frequently be omitted. Depending on the configuration of the guides of the baling plunger 48, the guide arms 56 and 62 can also engage off center of the baling chamber 18, that is, the bearing locations 58, 64 of the guide arms 56, 62 remain unchanged.

Between each side of the cover 21 and the bottom 23, a vertical side wall 96 is received in a respective vertical slot 98 provided in each side or vertical leg 99 of the yoke 72, which is configured as a "U" and made of tubing material or as a weldment. The side walls 96 extend beside and may be releasably fixed to the cover 21 and are connected to the base body 76. The legs 99 of the yoke 72 are joined to each other by a bridge 86.

The legs 99 and the bridge 86 may be configured as one-piece or multi-piece parts. At the lower end of each leg 99 of each of the longitudinally spaced yokes 72 a connection 104 is provided for a servo motor 106, that is described in greater detail below. In place of the servo motors 106, other repositioning mechanisms could also be used, for example, levers, threaded spindles, etc. At the under side of the yoke 72, the cover 21 is rigidly attached to the bridge 86.

The base body 76 is configured in the form of a "U", whose legs extend upward to the yoke 72. Between the legs, the bottom 23 rests on the base body 76 and is connected to it. Approximately at half the height of the legs, a guide 108 configured as a U-shaped rail is attached to each side on or in the legs in parallel relationship to the bottom 23. These guides 108 enclose the rolls 90 of the lower part 80 in themselves, free to rotate. The side walls 96 may either include upper and lower sections respectively located above and below the guides 108, or may include a slot in their forward region in which the guide 108 is located. In the upper region of the legs of the base 76, openings 92 are provided through which journals 94 extend, free to move. These journals 94 are fixed to the yoke 72 and establish a pivotal connection with the needle support arms 70. While the bottom of the base body 76 is also made from a tube, a rail, a weldment or the like, its legs are configured as vertical guides that contain an interior space that defines a guide slot 110. At the bottom of each guide slot 110, the interior space defines a horizontal surface where a connection 104 is also provided for the other end of the servo motor 106. In the region of the guide slot 110 located above this, the legs 99 of the yoke 72 are engaged so as to slide and are free to move vertically.

Thus, the servo motors 106 extend between the bottom of the interior space and the lower ends of the legs of the yoke 72 and are connected so as to establish a releasable positive lock between the connections 104. The servo motors 106 may be configured as hydraulic motors as well as electric motors, which, however, may depend on the forces to be transmitted, the space available and the like. There must, however, be a guarantee that all servo motors 106 cover exactly the same path during an adjustment or repositioning process, so that there is no warping between each of the yokes 72. The servo motors 106 are remotely controlled, for example, from the vehicle towing the baler 10. While the present embodiment started with the assumption of double-acting hydraulic motors as servo motors 106, in other embodiments single-acting hydraulic motors could be used, that are again retracted downward on the basis of spring force or the force of gravity of the yoke 72.

On the basis of the above description the result is the following configuration and the following operation.

The bottom 23 and the guides 108 are inserted into the base body 76 and fastened. Following this, the servo motors 106 are inserted into the interior spaces of the legs of, and connected to, the base body 76, and, then, connected to a hydraulic system, not shown. The side walls 96 are then installed. Then the baling plunger 48, with or without the upper part 78, is assembled with its rolls 90 slid into the guides 108. The guide arm 62 is then connected to the baling plunger 48. Subsequently each yoke 72 is slid into the interior spaces 110 and connected to the cover 21 and the servo motors 106, unless the cover 21 had previously been installed. Finally the journals 94 are inserted through the openings 92 and fastened to the yoke 72 and connected to the needle support arms 70.

Figure 4:
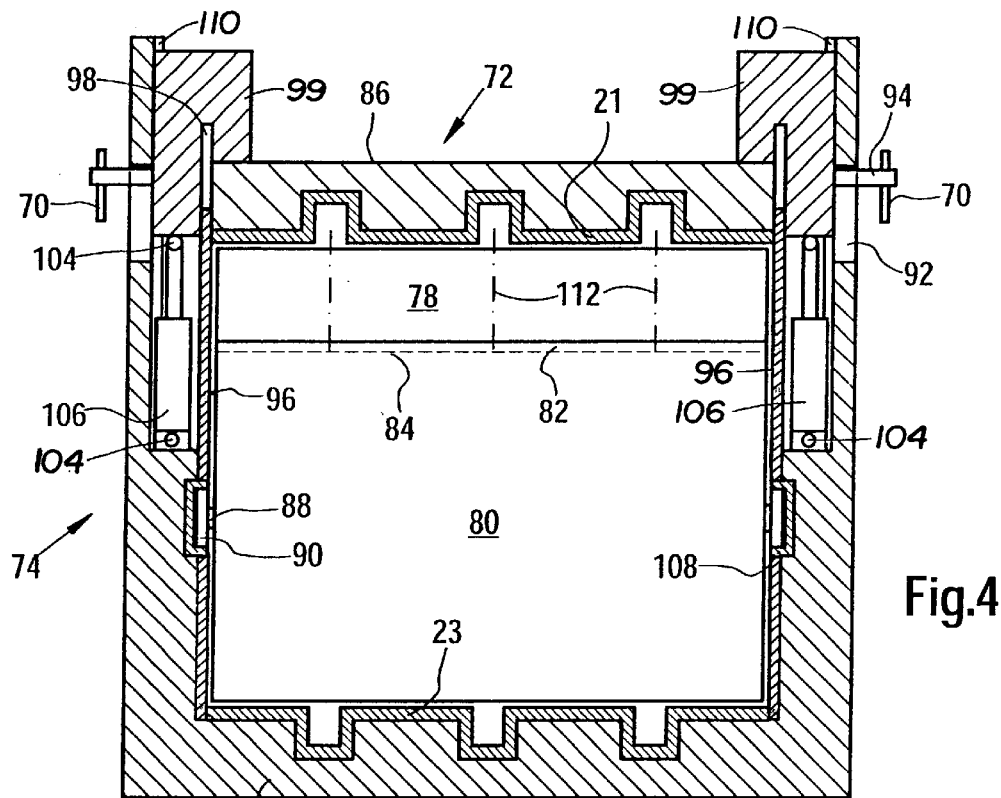
FIG. 4 is a vertical transverse sectional view taken along line 4—4 of FIG. 1 and showing the baling chamber in a maximum vertical height condition.
Figure 5:
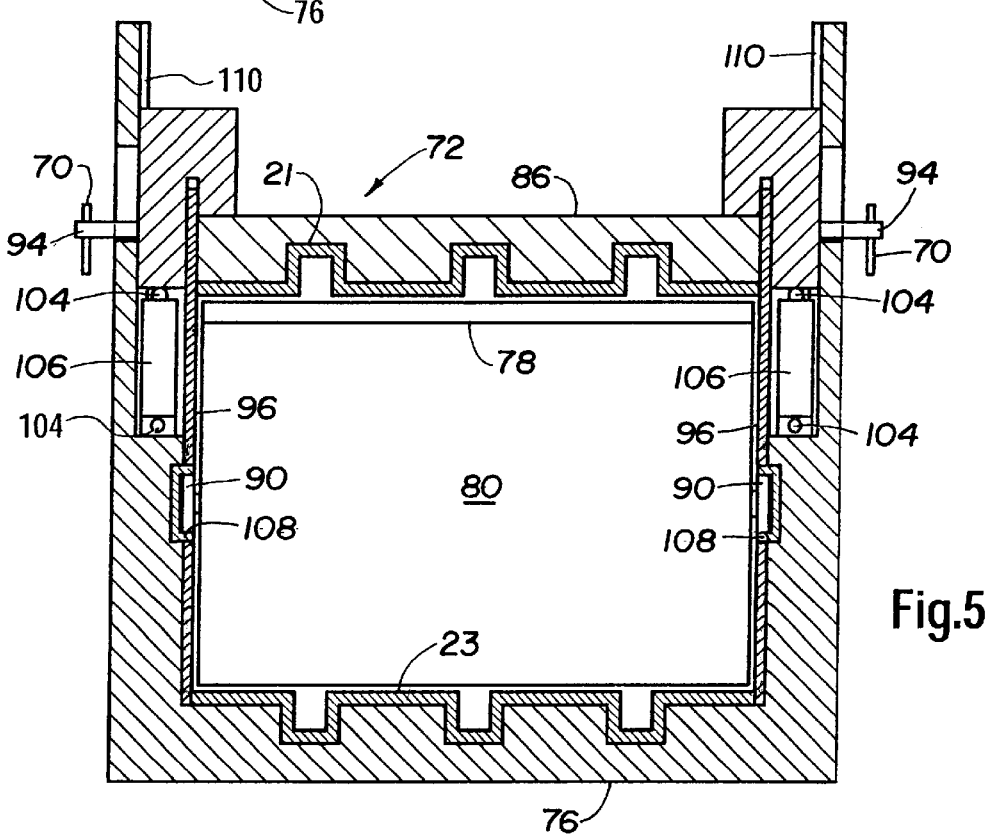
FIG. 5 is a vertical transverse sectional view, as shown in FIG. 4, but with the baling chamber being shown in a minimum vertical height condition.

According to FIGS. 2 and 4, the baling chamber 18 can occupy a maximum height condition so as to establish a height X, or, according to FIGS. 3 and 5, it can occupy a minimum height condition so as to establish a height Y.

The further description begins with the condition that the baling chamber 18 contains a baling plunger 48 composed of the upper and a lower parts 78 and 80, respectively, and that the maximum height condition exists, according to FIGS. 2 and 4, and is to be adjusted or converted into the minimum height condition illustrated in FIGS. 3 and 5, following the procedure stated below.

The securing means 112 are released, the upper part 78 is raised slightly so that the positive lock is released and the upper part 78 is pulled out of the baling chamber 18 towards the rear. If the access to the securing means 112 should be insufficient or if the upper part 78 cannot be raised sufficiently, the servo motors 106 must first be extended far enough. Finally the bearing location 64 on the lower part 80 is repositioned.

Subsequently the servo motors 106 are retracted synchronously into the height of the upper part 78 which had been removed, and pull the yokes 72 downward, whereby the height of the baling chamber 18 is reduced. Simultaneously, the bearing location 58 is shifted, so that the stroke of the baling plunger 48 and the position of the guide arms 56, 62 remain unchanged with respect to the baling plunger 48.

As a result of the attachment of the needle assembly 42 to the yoke 72 or the upper part of the housing 20, the former also moves upward or downward and maintains the spacial relationship to the knot tying device assembly 66.

While the present embodiment is based on the initial assumption that the upper part of the housing 20 is movable and the lower part of the housing 22 is fixed, this could also be the reverse, where then, however, the supply channel 26 and the components connected to it would have to be modified accordingly. Finally all side walls, the cover 21 and the bottom 23 could be repositioned individually or in unison.

Having described the preferred embodiment, it will become apparent that various modifications can be made without departing from the scope of the invention as defined in the accompanying claims.

What is claimed is:

1. In a baler including a frame, a baling chamber, defined by upper and lower parts and opposite side walls for producing parallelepiped bales, a plunger drive arrangement coupled between the frame and a baling plunger received for reciprocating within a forward region of said baling chamber, and a needle arrangement having needle support arms pivotally attached at opposite sides of said baling chamber for guiding needles carried by the arms to deliver twine to a tying device mounted to said upper part of said baling chamber, the improvement comprising:

said upper and lower parts of said baling chamber respectively having top and bottom walls disposed parallel to each other and being separate in said forward region of said baling chamber; and said upper part being mounted for being repositioned with respect to said lower part while maintaining said upper wall in parallel relationship to said bottom wall so as to adjust the cross section of said forward region of said baling chamber.

2. The baler defined in claim 1, wherein said arms of said needle support arms are connected to said movable upper part of said forward region of said baling chamber.

3. The baler defined in claim 1 wherein said baling plunger drive arrangement includes a guide arm arrangement having a pivotal connection with said frame; and said pivotal connection being mounted so as to be adjusted in order to reposition said guide arm arrangement in a direction of adjustment of said upper part of said baling chamber.

4. The baler defined in claim 1 wherein a plurality of servo motors are coupled to said upper part and are operated in parallel to cause said upper part to be selectively adjusted.

5. The baler defined in claim 4 wherein said plurality of servo motors are hydraulic motors.

6. The baler defined in claim 1 wherein said forward region of said baling chamber includes opposite side walls connected to one of said upper and lower parts and extending vertically an entire extent of a maximum height dimension of said baling chamber, with said other of said upper and lower parts being mounted for sliding vertically relative to said side walls.

7. The baler defined in claim 1 wherein said baling chamber is enclosed at several longitudinally spaced locations by repositioning arrangements located at each spaced location; said upper part being a longitudinally extending cover;

said repositioning arrangements each including a yoke coupled to said cover and being mounted for vertical movement so as to reposition said cover vertically;

each repositioning arrangement further including a U-shaped base extending below and having legs extending vertically alongside said baling chamber and being operatively associated with said yoke;

said lower part of said baling chamber including a longitudinally extending bottom supported by said base; and a plunger guide rail extending longitudinally between, and being supported by said legs of the longitudinally spaced repositioning arrangements.

8. The baler as defined in claim 1 wherein said baling plunger includes a lower part and at least one upper part vertically adjustably mounted to said lower part.

9. The baler as defined in claim 8 wherein said lower part and at least one upper part of said baling plunger includes respective positive locking elements which can be brought into engagement with one another.

10. The baler as defined in claim 9 wherein said lower part and at least one upper part of said baling plunger include securing devices for releasably securing said upper and lower parts together as an assembled, fixed unit.

11. The baler as defined in claim 1 wherein said baling chamber is enclosed at longitudinally spaced locations respectively by repositioning arrangements;

said repositioning arrangements each including a base including a pair of legs extending along side said baling chamber;

each leg being provided with a vertically oriented guide channel;

a yoke extending over said baling chamber and having opposite ends respectively received for moving vertically in an associated guide channel;

opposite ends of said yoke being respectively provided with vertically oriented guide slots; and said baling chamber including opposite side walls positioned within said repositioning arrangements and located for free vertical sliding in an adjacent guide slot of the yoke of each repositioning arrangement.

12. The baler as defined in claim 1 wherein a repositioning arrangement surrounds said baling chamber in a region of the connection of said needle support arms;

said repositioning arrangement including a base body having opposite legs respectively extending along opposite sides of said baling chamber;

said opposite legs respectively containing a pair of clearance openings;

respective journals extending through said clearance openings and fixed for movement with said upper part; and said needle support arms being respectively coupled for pivoting about said journals.

\* \* \* \* \*